US012230166B2

(12) United States Patent
Wight

(10) Patent No.: US 12,230,166 B2
(45) Date of Patent: Feb. 18, 2025

(54) SYSTEMS AND METHODS OF POSITIONING A FLAG ON A FLAGPOLE

(71) Applicant: William R. Wight, Kingsport, TN (US)

(72) Inventor: William R. Wight, Kingsport, TN (US)

( * ) Notice: Subject to any disclaimer, the term of this patent is extended or adjusted under 35 U.S.C. 154(b) by 900 days.

(21) Appl. No.: 16/907,871

(22) Filed: Jun. 22, 2020

(65) Prior Publication Data

US 2020/0402431 A1 Dec. 24, 2020

Related U.S. Application Data

(60) Provisional application No. 62/864,712, filed on Jun. 21, 2019.

(51) Int. Cl.
*G09F 17/00* (2006.01)

(52) U.S. Cl.
CPC ...... *G09F 17/00* (2013.01); *G09F 2017/0025* (2013.01); *G09F 2017/005* (2013.01)

(58) Field of Classification Search
CPC ............. G09F 17/00; G09F 2017/0025; G09F 2017/005
USPC ........................................................ 116/173
See application file for complete search history.

(56) References Cited

U.S. PATENT DOCUMENTS 3,418,967 A * 12/1968 Donkersloot ........... G09F 17/00 52/146
3,712,556 A * 1/1973 Bosco ..................... D06F 57/00 242/399
3,737,749 A * 6/1973 Schmit .................... G09F 17/00 318/472
10,801,229 B1 * 10/2020 George, Sr. ............. E04H 12/32
2007/0006794 A1 * 1/2007 Swenson ................. G09F 17/00 116/173
2007/0089663 A1 * 4/2007 Dunbar .................. G08B 5/002 116/173
2007/0220790 A1 * 9/2007 Wagter .................... G09F 17/00 40/218
2008/0121167 A1 * 5/2008 Randall ................... G09F 17/00 116/173

* cited by examiner

*Primary Examiner* — Muhammad Ijaz
(74) *Attorney, Agent, or Firm* — Pitts and Lake P.C.

(57) ABSTRACT

Systems and methods of positioning a flag on a flagpole, including a movement mechanism attached to the flagpole, a power source configured to provide power to the movement mechanism, a halyard mechanism coupled to the flag and the movement mechanism to move the flag along the flagpole, and a control unit configured to selectively actuate the movement mechanism to position the flag at a predetermined location of the flagpole according to instructions communicated to the control unit from a centralized controller.

13 Claims, 5 Drawing Sheets

SYSTEMS AND METHODS OF POSITIONING A FLAG ON A FLAGPOLE

CROSS-REFERENCE TO RELATED APPLICATIONS

This application claims the benefit of U.S. Provisional Application No. 62/864,712, filed on Jun. 21, 2019.

FIELD OF INVENTION

The present general inventive concept relates to systems and methods for automatically raising and lowering flags on flagpoles to ensure that flags are maintained in their proper position on the flagpole during various time periods and more specifically to automated raising and lowering and of flags thereon in accordance with calls for flag honors (half-staff) by proper authorities or as directed by an authorized manager of the flagpole display.

BACKGROUND

It is often the case that businesses and government agencies experience some loss of goodwill when they fail to timely respond, or fail to respond at all, to calls by proper authorities for flags to go to half-staff during certain time periods. There are several different possible failure modes: the flag fails to move to half-staff at all; the flag moves to half-staff late (hours or days), frequently at the request of a concerned citizen; the flag returns to full-staff early (this is particularly likely for longer events); or the flag returns to full-staff late—sometimes days late. In each case, the flag owner suffers some level of embarrassment. They usually want to comply, but they suffer from lack of awareness (particularly for unplanned events) and inconvenient flag movement hours (sunrise and sunset, weekends and holidays). They are also often unaware of the etiquette prescribed for flag movements. Reminder systems could address some of the failure modes, but would not resolve all of the problems discussed above. It is also challenging for individuals, businesses, and governmental agencies to keep track of, and implement, the raising and lowering of flags on a daily and/or periodic basis.

Remotely-operated flag hoist apparatuses have typically been concerned with moving flags installed thereon into some form of protective storage to prevent deterioration due to inclement weather. Recent developments in synthetic flag materials and improved flag construction have largely mitigated these concerns. Coupled with the widely accepted practice of displaying flags continuously with proper illumination, it is now commonplace for flag owners to display one or more flags on one or more poles on a continuous, largely unattended basis. Unfortunately, flag owners may neglect the timely positioning of flags to half-staff on appropriate days. The irregularity of such occasions and the typically specified movement of flags at sunrise and sunset and/or on holidays often result in flag owners neglecting the flag's position altogether, or at least until reminded by an interested party, with commensurate loss of goodwill.

BRIEF SUMMARY

Example embodiments of the present general inventive concept provide systems and methods for automatically raising and lowering flags according to specified times. In some embodiments, the system can include a movement mechanism, such as a modified garage door opener, attached to the flagpole. A power source can be configured to provide power to the movement mechanism. A length of cord-like material, such as a string, wire, chain, rope, or the like can be attached to a gear within the movement mechanism to move the flag up or down the flagpole. The cord-like material can be designed to provide incrementally spaced over-weaves for calibration of cord location relative to a sprocket-like device of the movement mechanism.

In some embodiments, two or more holding devices, such as rings, can be attached to both the flag and to the length of cord. One or more pulleys can be configured to receive the length of cord and to allow both the length of cord and the flag to move in a generally vertical direction up or down. A control system can be configured to provide remote or direct control of the movement of the flag in the generally vertical direction up or down.

Example embodiments of the present general inventive concept can be achieved by systems and methods of positioning a flag on a flagpole, including a movement mechanism attached to the flagpole, a power source configured to provide power to the movement mechanism, a halyard mechanism coupled to the flag and the movement mechanism to move the flag along the flagpole, and a control unit configured to selectively actuate the movement mechanism to drive the halyard mechanism to position the flag at a predetermined location of the flagpole according to instructions communicated to the control unit from a centralized controller, such as from a server connected to the internet to communicate flag event details from various jurisdictions.

Example embodiments of the present general inventive concept can be achieved by a system configured to set or move a flag up and/or down a flagpole, including a movement mechanism attached to a base of a flagpole, a power source configured to provide power to the movement mechanism, a cord-like member attached to the movement mechanism, a fastening device attached to both the flag and to the cord-like member, and a control system configured to selectively control operation of the movement mechanism to selectively maneuver the cord-like member so as to move the flag up or down the flagpole to a pre-determined position according to instructions from the control system.

The control system can be configured to receive, store, and implement instructions from a centralized controller.

Additional features and embodiments of the present general inventive concept will be set forth in part in the description which follows, and, in part, will be obvious from the description, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying images, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying images in which.

DETAILED DESCRIPTION

Figure 1:
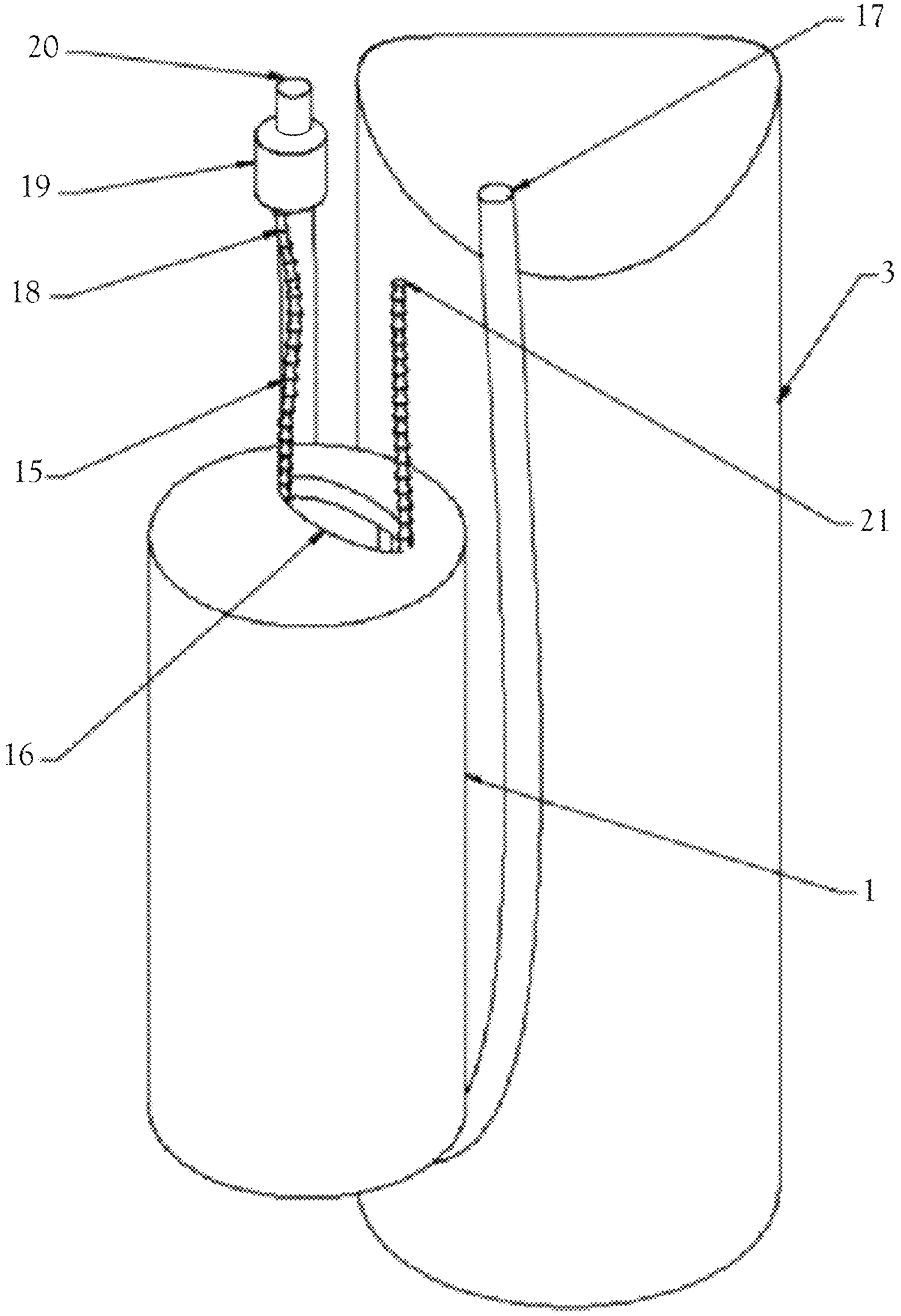
FIG. 1 is an image of the lower end of the installed flagpole apparatus, according to example embodiments of the present general inventive concept.

In one embodiment of the present general inventive concept, a central flag honors event repository, using a controlling program may be used to provide information on relevant flag honors events to flagpoles equipped with an apparatus, which are enabled by the apparatus installed thereon to reposition the flag independently, while also providing flag owners with information about the event which can subsequently be communicated with other parties. The system also provides monitoring to assure that flags have been positioned as specified.

Example embodiments provide a device configured to set, lower, and raise a flag based on instructions received from a control unit in communication with a central controller via a network connection. This semi-autonomous system may receive instructions from the central controller based on a configuration in which the particular flag display is subscribed to one or more jurisdictions (e.g. federal, state, municipal, organizational, geographical or personal). The central controller is informed of proper calls for flag honors, along with the dates and times (or controlling events, such as sunrise or sunset) prescribed by the requesting authority. The control unit may also receive information regarding which flags are to be moved to half-staff and the reason(s) that the person(s) or event(s) specified are being so honored. An example embodiment may also include a process for informing subscribers of the reason, extent, and duration of the flag honors event.

Because the appropriate time of day at which the flag should be repositioned may depend on the date and the geographic location of the flagpole, as is the case for the most common controlling events—sunrise and sunset—the device may be programmed to determine its approximate location and the date and time so as to independently determine the local time at which to comply with the call for flag honors and to comply at the resulting time.

Additionally, flag owners are frequently questioned by observers as to the reason for flag honors being rendered, so in one embodiment, the system may provide notification of the reasons, extent, and duration of flag honors events for the jurisdictions to which their flag displays are subscribed. Examples of such notification include various "push" methods, such as electronic mail or other text messaging services or social media posts. Other methods could include the posting of such events to a site or sites on the worldwide web which can be accessed by subscribers, and which can subsequently be displayed on subscribers' own web sites, mobile applications, or dedicated devices to inform interested parties regarding the person(s) or events being recognized with flag honors.

Example embodiments of the present general inventive concept provide a new and improved apparatus for maintaining flag position on a flagpole. The system is configured to automatically raise and lower a flag according to specified times. In some embodiments, the system can include a movement mechanism, such as a modified garage door opener, attached to the base of the flagpole, or similar motive means for effecting control of componentry to position a cord-like material to move the flag up or down the flagpole. A suitable power source can be configured to provide power to the movement mechanism, such as direct or alternating current, solar/wind power, or other known or later developed energy harvesting or storage device. A length of cord-like material, such as a string, wire, chain, or the like can be attached to a gear within the movement mechanism to move the flag up or down the flagpole, but the present general inventive concept is not limited to any particular type of cord-like material so long as it is suitable to carry out the movements described herein. Two or more holding devices, such as but not limited to rings, can be attached to both the flag and to the length of cord. One or more leveraging devices, such as pulleys, can be configured to receive the length of cord and to allow both the length of cord and the flag to move up or down the flag pole. A control system can be configured to provide remote or direct control of the movement of the flag.

Some embodiments can include a modified garage door opener attached to the base of the flagpole; a power source configured to provide power to the modified garage door opener; a length of cord attached to a gear within the modified garage door opener; two or more rings attached to both the flag and to length of cord; one or more pulleys configured to receive the length of cord and allow both the length of cord and the flag to move in a generally vertical direction up or down; and a software control system configured to provide remote control of the movement of the flag in the generally vertical direction up or down.

Although example embodiments are described in terms of a modified garage door opener, the present general inventive concept is not limited thereto. Various other types of movement mechanisms could be chosen or developed using sound engineering judgment. For example, the gear which normally operates a belt attached to the garage door may be configured with a reel upon which a length of nylon rope may be wound or unwound, depending on the direction that the gear is turning. The rope may rise to the top of the pole, where it passes through a secondary pulley which can be attached to the customer's original halyard. The customer's halyard may be installed in the normal fashion, but the flag hooks normally used to secure the flag have been removed.

In some embodiments, once the cord-like material passes through the pulley, a descending portion of the cord may be attached to the customer's flag. The flag's grommets, normally attached to the now-removed flag hooks, may be clipped to D-rings which also pass around the customer's halyard, but which can slide freely up and down the halyard. In this manner, the motor at the base can raise and lower the flag without the customer's halyard being moved. The garage door opener may, in turn, be configured with home automation software which allows it to be "opened" and "closed" via a remote application. Selecting "Close" causes the flag to descend to half-staff. Selecting "Open" raises it back to the full-staff position.

Notification regarding flag modification events may be achieved by different approaches. In one embodiment, an e-mail may be distributed to a list of subscribers, detailing the reason and duration of the event; a similar explanation may be posted to a web or social media page, which is available to subscribers and non-subscribers alike. Flag events are detected by several means: Registration may be made with several governmental and independent notification systems; monitoring of News events and governmental sites may be monitored. Also, automate alerts (such as Google alerts) may be utilized. In one embodiment, a nationwide collection of flag honors events can be provided in a standardized form, supporting reliable publication. This may potentially enable source-level data collection, e.g. from each state government, rather than through a secondary notification system. Additionally, a flexible jurisdiction definition may be provided to support local half-staff orders which describe unconventional boundaries for the flag event.

When an event is detected, it may be confirmed through either direct observation of the appropriate governmental web site (which may be by Presidential or gubernatorial proclamation), or through confirmation of such a declaration by President or governor on major news outlets. Once confirmed, the flags may be set to be repositioned, either on a scheduled basis (at sunrise) or immediately, if the order so instructs.

In some embodiments of the present general inventive concept, the need for AC power and access to wi-fi can be mitigated and the security of the device can be enhanced by a custom-built device that mounts at the top of the pole, with the flag attached directly to it. The device may be battery-powered and connect to a private network via cellular signals, instead of wi-fi. In one embodiment, mounted inside a piece of thin-walled, PVC pipe, or any other material known in the art, the flag's header may line up with the pipe, making it unobtrusive. A solar recharging system can be used in conjunction with battery power. In another embodiment, continuous power such as household current may be converted to low-voltage before distribution to the poles, which simplifies code-compliant installation, for example such as a landscape lighting source/transformer illumination circuit arrangement. The system may also rely on the use of ball chain to support the flag as it raises and lowers along the customer's halyard.

In some embodiments of the present general inventive concept, a "crowd-sourced" half-staff detection process may be used in order to engage the energy exhibited by people who go into establishments to request the establishments to move their flags, to instead assist with detection and implementation of half-staff events. Through an "Adopt-a-pole" arrangement, interested individuals may take responsibility for observing whether particular flags have responded appropriately to declared half-staff events. The system may then take on the job of notifying flag owners of the need to reposition the flag. To assist with detection of non-scheduled events, a continuing "contest" may be offered by which users of the application could inform of potential half-staff events. When an event is confirmed, the first user to have correctly submitted the event may receive a small prize (e.g. a gift card).

In some embodiments of the present general inventive concept, an "officially-sourced" half-staff detection process may be applied by offering some incentive (e.g. "X" free subscriptions) to various state governments in exchange for their commitment to enter half-staff events directly into our system. Authorized state house personnel may use a form to enter the duration and reason for a state-level or state endorsement of a national-level event. They would be incentivized to be timely, as the poles controlled by the free subscriptions would move shortly after the information was entered into the system—along with every other subscribed pole in the jurisdiction.

In some embodiments of the present general inventive concept, enhanced-visibility notification may be provided by an e-mail or web/social media posting. In instances where the public-facing personnel are not enrolled for this notification, the current method may rely on local subscribers to forward the information to public-facing personnel. A novel approach to this notification involves the use of dedicated digital displays which, when connected to a customer's network, can receive images from remote sources. If such a display were installed and registered within the provider network, it may format and download appropriate explanations of half-staff events to the display which could be located in a public space (e.g. on the hotel's front desk) to provide an explanation of half-staff events. During periods of full-staff position, the display could also be used to call attention to full-staff holidays, or interesting flag facts. It could also serve as a marketing tool by displaying company information for passers-by.

Referring to FIG. 1, the apparatus may typically be installed on an existing flagpole 3, with existing halyard downhaul 17, which loops to become the existing halyard uphaul 20. The downhaul side, when pulled downward, serves to lower the flag, while the uphaul side, when pulled downward, serves to raise it. The specialized halyard 15 is shown with the uphaul end 18 and downhaul side 21. After passing through the access hole 16 in cover 1, the specialized halyard 15 engages the apparatus contained therein, as further illustrated in FIG. 3. The downhaul side 21 and existing halyard downhaul 17 both continue upward and are further illustrated in FIG. 2. The uphaul end 18 of the specialized halyard 15 is shown attached to the existing halyard uphaul by the uphaul connector 19. The specialized halyard 15 may consist of a ball chain with a polyethylene over-weave, resulting in a textured rope which can be passed through a sprocket without slippage, essentially providing a calibration, i.e., encoding function, for keeping track of flag location.

Figure 2:
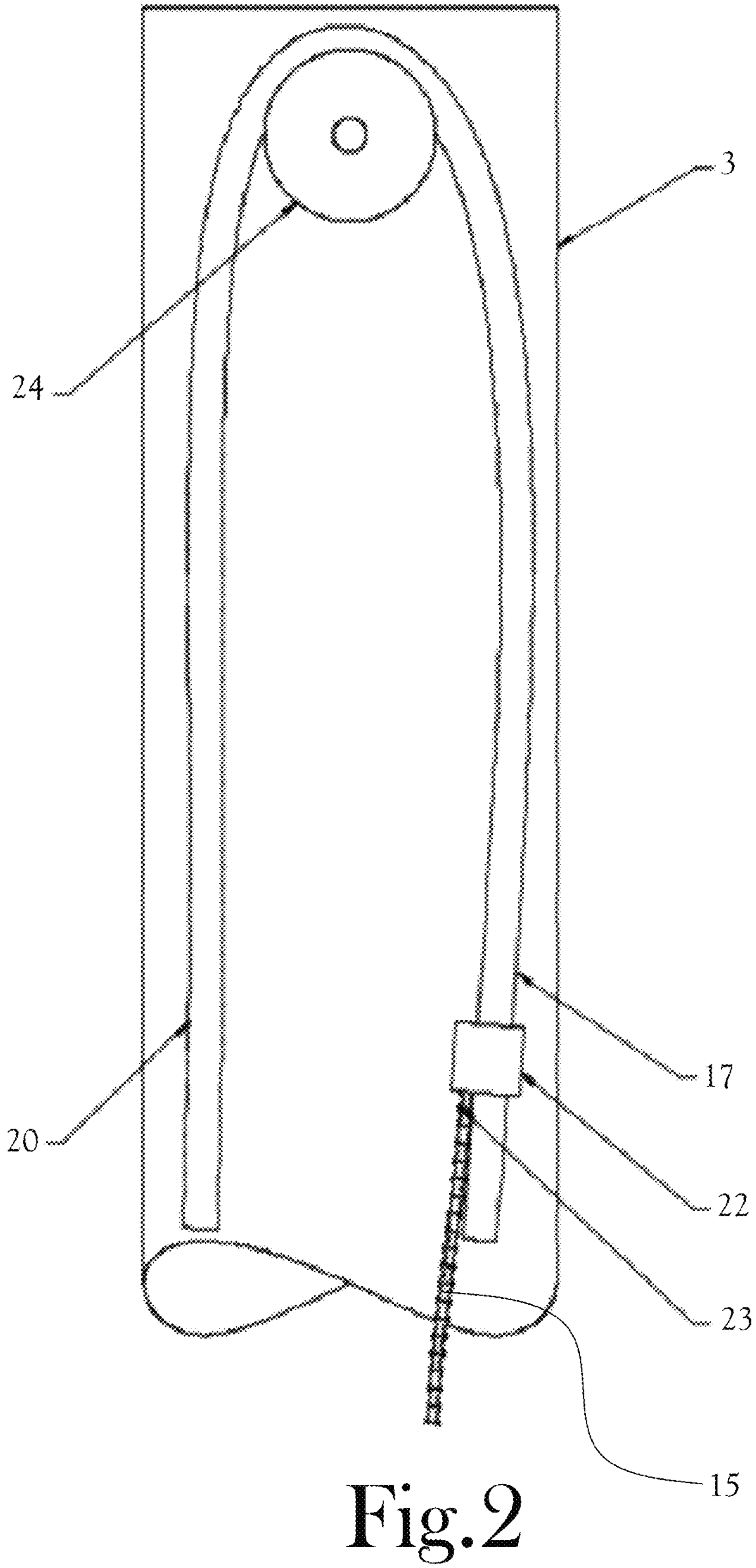
FIG. 2 is an image of the upper end of the installed flagpole apparatus, according to example embodiments of the present general inventive concept.

FIG. 2 shows, near the peak of existing flagpole 3, the downhaul end 23 of the specialized halyard 15 attached to the existing halyard downhaul 17 by the downhaul connector 22.

Figure 3:
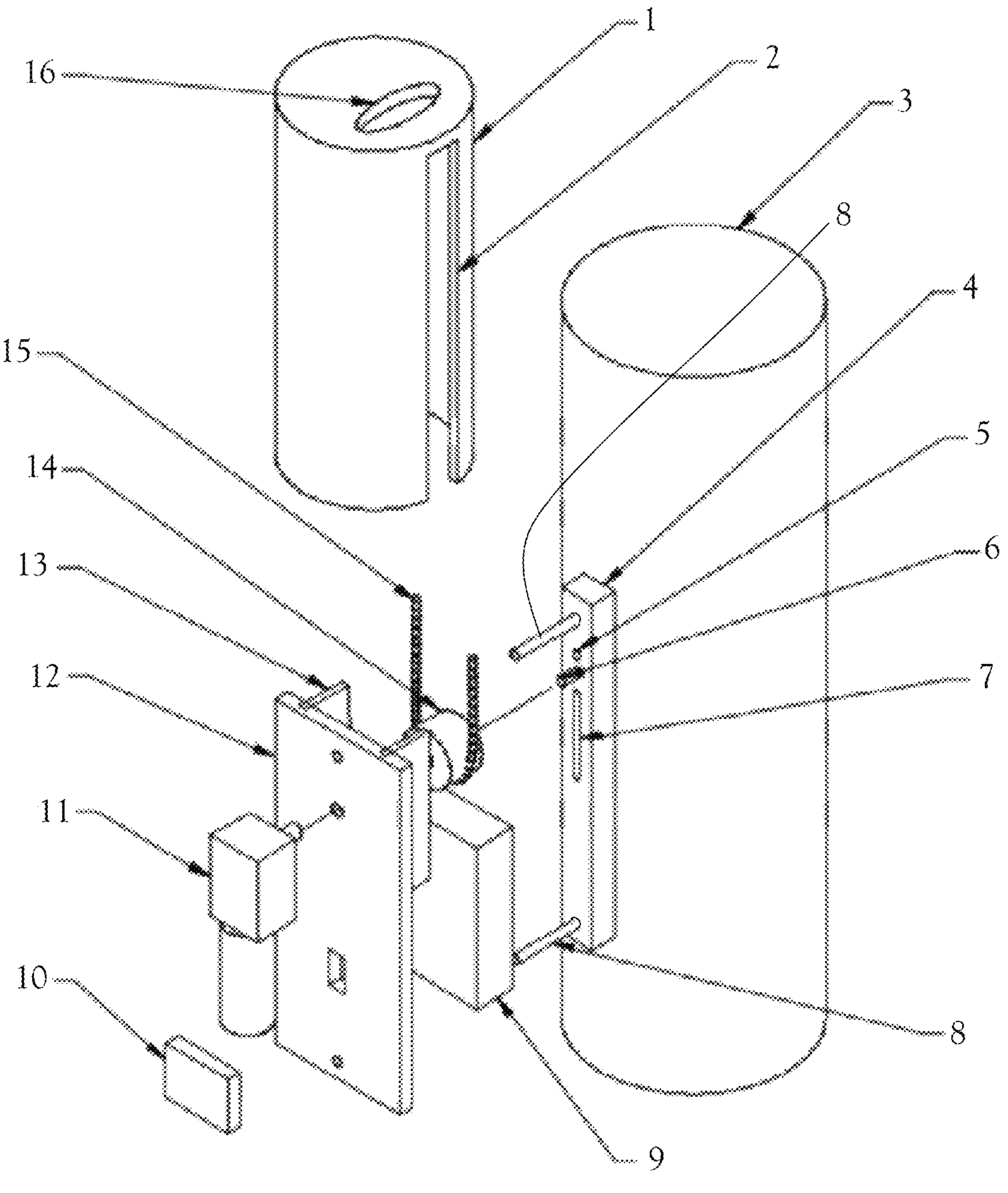
FIG. 3 is an image of the flagpole apparatus according to example embodiments of the present general inventive concept.

Shown in FIG. 3 is an exploded form of the apparatus including a cover 1 (note that the cover 1 has been rotated 90 degrees clockwise to reveal the slot 2 which engages the cleat mount 4 when lowered into position). The cover 1 encloses the motor unit, consisting of a gear motor 11, battery 10, chassis 12, electronics package 9, and sprocket 14. The gear motor 11, battery 10, and electronics package 9 are all affixed to the chassis 12. The sprocket 14 is connected to the output shaft of gear motor 11 extending through chassis 12 and also to the axle 6, which extends from the cleat mount 4. The cleat mount 4 features a hole 5 and slot 7 which are used to secure the cleat mount 4 to the cleat holes in the existing flagpole 3. The cleat mount 4 also includes upper and lower mounting lugs 8 which secure the chassis 12 to cleat mount 4. The specialized halyard 15 passes vertically through the access hole 16 in the top of cover 1, between the sprocket 14 and keeper 13, thence back up through the hole 16 in cover 1. Other figures will illustrate the connection between the specialized halyard 15 and the halyard of the existing flagpole 3.

The motor can be activated by the embedded electronics which may be controlled by a cellular IoT (Internet of Things) link. A weight attached to the bottom of the lowest flag may provide stability. The Control Dialogue may consist of a communication to position the flag (to either half or full) at a particular date and time, and a reporting of the flag position (either half, full or unknown). The Electronics Package may consist of a microcontroller board with one digital output, one analog input, and an IoT cellular module. The digital output may mimic a standard wall garage door opener activation button. The analog input may sense the height of the flag above the unit.

Figure 4:
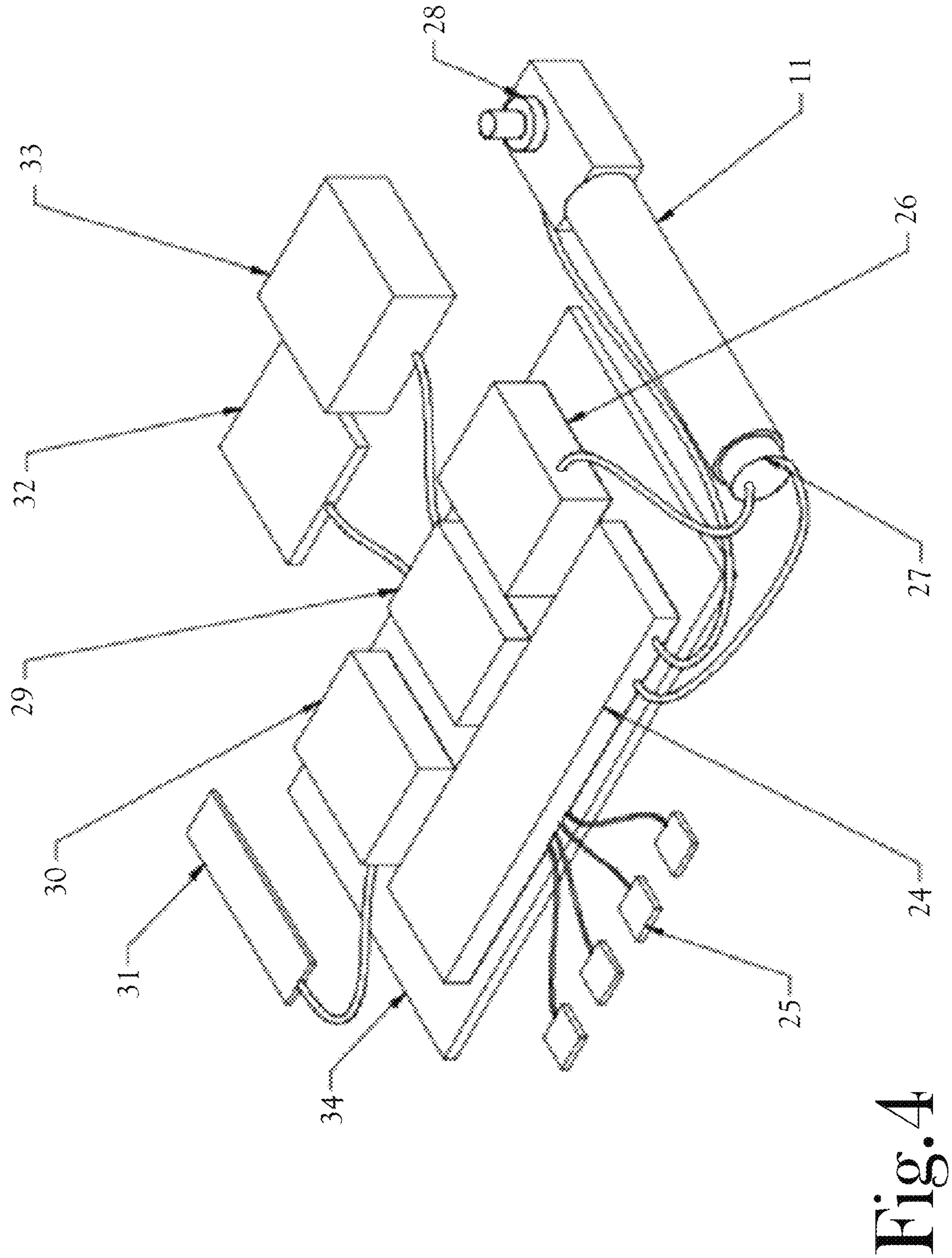
FIG. 4 is an image showing the electronics package schematics according to example embodiments of the present general inventive concept.

FIG. 4 shows schematic representation of the principal components in the electronics package. The components illustrated in this drawing represent the major functions of the electronics package. They may not physically appear as discrete components, as their functions may be combined in any of several ways into different physical implementations. With the possible exception of the power supply this package may be enclosed within the apparatus and may be mounted on a printed circuit board 34 or other electronics mounting. Collectively, these components serve to connect the apparatus with the controller as well as to effect movement of the flag by operating the reversible gear motor 11 to move the specialized halyard 15 shown in other views. The microcontroller 24 receives power from the power manager 29, which is in turn fed by the power supply 33 and/or backup battery 32. The power supply 33 is the primary source of power for the electronics package. It may draw its power from any of several places, including a solar array, rechargeable battery bank, or line current. The power manager 29 serves to convert the power to the form needed by any particular component, and to supervise charging of the backup battery 32. The buttons 25 provide for an onboard means of controlling certain device functions, normally for the purpose of configuration or manual operation. The communications module 30 establishes a networked connection to the controller, utilizing one or more antennas 31.

Communication may be established by any of several technologies, including but not limited to local area network, broadband wireless, or Bluetooth. The motor driver 26, acting upon signals received from the microcontroller 24, provides power from the power manager 29 to the gear motor 11, causing it to rotate in either a clockwise or counterclockwise direction. As the gear motor 11 rotates, signals emitted by a rotary encoder 27 are sent to the microcontroller 24, which interprets them for the purpose of tracking the amount of rotation of the gear motor 11 shaft. An alternate rotary encoder may be mounted on the output shaft 28 of gear motor 11 for the same purpose.

Figure 5:
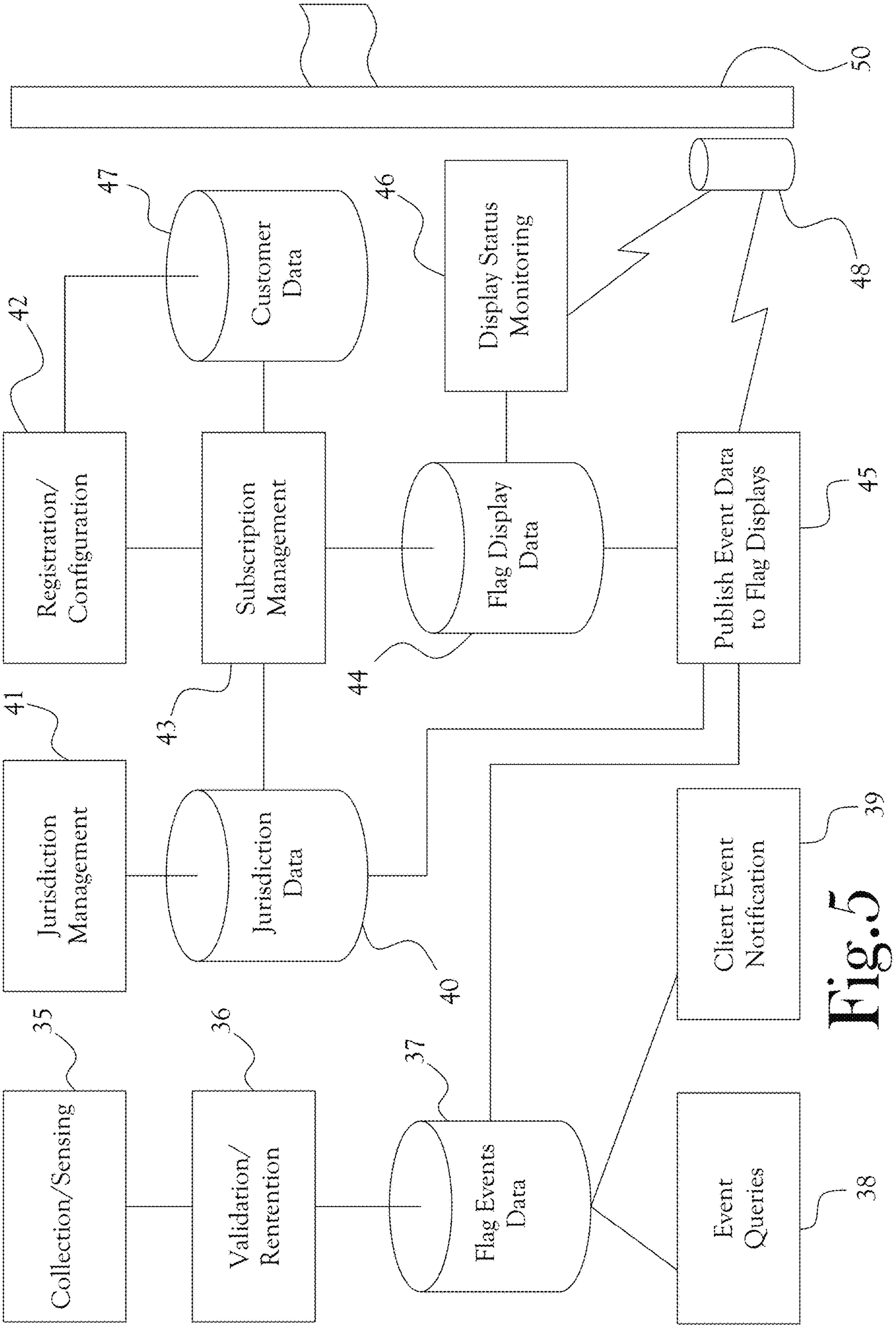
FIG. 5 is a diagram of example operations of the central controller showing a process flow chart of the various information systems components according to example embodiments of the present general inventive concept.

FIG. 5 shows example process flows of information system components of a central controller illustrating relationships of information and signals used to remotely activate and control operation of the movement apparatus in response to flag orders from the central controller.

As illustrated in FIG. 5, Collection/Sensing module 35 of the central controller can be configured to detect candidate half-staff events, such as by monitoring various sources of half-staff events via e-mails from public or private sources, monitoring of news sources, and/or direct entry of event boundaries by authorized personnel. Detected events can be converted into a standard nomenclature, then passed to Validation/Retention module 36 for further processing.

Validation/Retention module 36 can be configured to review half staff events for accuracy and authenticity, using various known or later developed confirmation sources. When the validation step is complete, the Validation/Retention module 36 can pass validated event data to a Flag Events Data module 37, which can be configured as a storage entity for retention and further action. For example, the Flag Events Data module 37 can be configured as a data storage repository (e.g. relational database) configured to retain records of all half-staff events. Key data, such as dates, times or controlling events (e.g. sunrise and sunset), the honoree, applicable jurisdictions, and affected flags can be retained in connection with the event. Those which have been deemed to be valid can provide a basis for further action by the Event Queries module 38, a Client Event Notification module 39, and a Publish Event Data to Flag Displays module 45. For example, the Event Queries module 38 can be configured to enable a user (such as clients or other authorized personnel) to gain access to the flag event data.

The Event Queries module 38 may be included as a web page, mobile application function, or as a request from an automated device designed to display current half-staff information. Based on sortation and selection information, the Event Queries module 38 can be configured to retrieve event data from the Flag Events Data module 37 for display to the requestor. The Client Event Notification module 39 can be configured such that at some specified time prior to (or just after) the effective time of an event, the module 39 can employ one or more of several potential notification systems (e.g. e-mail, text message, social media, web posting, dedicated display device, and the like) to pass event data from the Flag Events Data module 37 to designated recipients.

The Jurisdiction Data module 40 can be configured as a repository containing information about each jurisdiction that will be used to define the scope of a half-staff event. Jurisdictions are expected to overlap, with the most obvious being the federal and state jurisdictions. Some jurisdictions may be defined by comparatively narrow parameters, like zip codes or congressional districts, while others may not be geographic in nature (such as an organizational jurisdiction—a company or social group). The data contained in Jurisdiction Data module 40 can be managed by the Jurisdiction Management module 41 and can function in connection with Subscription Management module 43 and the Publish Event Data to Flag Displays module 45. The Jurisdiction Management module 40 can be configured according to various jurisdictions over which half-staff events can take effect. While far-ranging jurisdictions can be associated with the nation as a whole and/or individual states, it is possible there may be a significant number of half-staff events which are declared to affect a locality, such as municipality, legislative district, or a collection of similar groups, like fire stations. The Jurisdiction Module 40 can be configured to provide means for defining and refining such definitions of flag events.

A Registration/Configuration module 42 can be configured such that when a new flag movement system is installed, the system can be registered and configured before it is placed into service. Such information, such as the number and size of flagpoles associated with a display, the number of halyards and flag to be controlled on each one, the identity of the display's owner, and the physical location of the display can be captured and retained. This information can be added to or updated in the Customer Data module 47. The Customer Data module 47 can be configured to link with a Subscription Management module 43 to ensure the system is subscribed to one or more jurisdictions in order to receive the appropriate flag event orders. For example, the Subscription Management module 43 can be configured to provide a linkage between customers, as reflected in the Customer Data module 47, as well as jurisdictional instructions found in Jurisdiction Data module 40 and individual installations from the Flag Display Data module 44. These relationships and interactions between the modules enable the system to link individual flag displays at various locations to applicable flag orders of one or more jurisdictions.

The Flag Display Data module 44 can be configured such that each client flag display, along with its constituent flagpoles, halyards, and flags under management, can be retrieved. Data supplied from the Registration/Configuration module 42 and the Subscription Management module 43 can be utilized by the Publish Event Data to Flag Displays module 45 and/or by the Display Status Monitoring module 46 to display status of events and subscription data to a user. For example, the Publish Event Data to Flag Displays module 45 can be configured to periodically notify individual flag management mechanisms 48 (e.g., movement mechanism, halyard mechanism) of pending half-staff events, based on data found in the Flag Events Data module 37, Jurisdiction Data module 40, and Flag Display Data module 44. A Display Status Monitoring module 46 can be provided in order to ensure proper positioning of flags at all times. This module 46 can be configured to ascertain the proper position of each flag in a managed display using data from the Flag Display Data module 44 and to compare the data with flag position information returned electronically by the individual apparatuses 48 attached to the various flag pole displays 50. Customer Data module 47 can be configured to contain records of individual customers, and link them to the Flag Display Data module 44 via the Registration/Confirmation module 42 and the Subscription Management module 43. The flag position movement mechanism 48 can be configured to control the positioning of halyards on which various flags are displayed in accordance with information provided to it by the central controller illustrated in FIG. 5.

Example embodiments of the present general inventive concept can provide an apparatus for maintaining flag position on a flagpole, comprising a modified garage door opener attached to the base of the flagpole, a power source configured to provide power to the modified garage door opener, a length of cord attached to a gear within the modified garage door opener, two or more rings attached to both the flag and to length of cord, one or more pulleys configured to receive the length of cord and allow both the length of cord and the flag to move in a generally vertically direction up or down, and a software control system configured to provide remote control of the movement of the flag in the generally vertically direction up or down.

Such a device/system can provide a useful approach to maintain proper flag positioning and can be produced in an economic fashion. The device/system can be installed on existing poles without the need for specially constructed poles, or costly retrofit adaptor devices, allowing for economical retroactive automation. It effectively eliminates the need to have attendant personnel at all times to monitor proper flag positioning. Such a device/system increases efficiency while also lowering cost.

Example embodiments of the present general inventive concept can be adapted to provide a control unit and movement mechanism configured to selectively display a mourning ribbon on flagpoles during flag-honors events when movement of the flag itself to a half-staff position is not desired or practical for the flag event. In such cases, it is contemplated that the movement mechanism can be configured, for example, to include a spindle mechanism or other suitable mechanism configured to reciprocally wind/unwind a mourning ribbon for a flag-honors event.

As described, the systems, apparatus, methods, processes, control systems, functions, and/or operations and software for implementing the example embodiments of the present general inventive concept, for example the central controller and/or control unit, may be wholly or partially implemented in the form of apparatus that includes processing elements and sets of executable instructions. The executable instructions may be part of one or more software applications and arranged into software architecture. In general, embodiments of the present general inventive concept may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

The application modules may include any suitable computer executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the control systems, apparatus, methods, processes, functions, software and/or operations for implementing the example embodiments of the present general inventive concept may be wholly or partially implemented in the form of a set of instructions executed by one or more programmed computer processors such as a central processing unit (CPU) or microprocessor. Such processors may be incorporated in the circuitry and components of an apparatus, server, client or other computing or data processing device operated by, or in communication with, other components of the system.

It should be understood that the modules of the present invention as described and illustrated herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes, modules, or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to some example implementations, the term control unit or central controller can be referred to as a processing unit or processor, as used herein, which may be a central processing unit (CPU), or conceptualized as a CPU (such as a virtual machine). In such example implementation, the CPU or a device in which the CPU is incorporated may be coupled, connected, and/or in communication with one or more peripheral devices such as the EIS measuring unit, as well as one or more displays. In other example implementations, the processing unit or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to configurations, functions, processes, or methods. It will be understood that one or more of the configurations, methods, processes, and functions can be implemented by computer-executable program instructions. Note that in some embodiments, one or more of the configurations, methods, processes, systems, and functions may not necessarily need to be performed in a particular order, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, systems, or methods described herein.

These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment.

The invention claimed is:

1. A system of positioning a flag on a flagpole, comprising:

- a movement mechanism attached to the flagpole;
- a power source configured to provide power to the movement mechanism;
- a halyard mechanism coupled to the flag and the movement mechanism to move the flag along the flagpole; and
- a control unit configured to selectively actuate the movement mechanism to drive the halyard mechanism to position the flag at a predetermined location of the flagpole according to instructions communicated to the control unit from a centralized controller;
- wherein the system further comprises a cover, a cleat mount, a chassis and a motor, the cover defining a slot extending along a longitudinal direction and passing through the perimeter of the cover; the slot configured to receive the cleat mount, and wherein the cleat mount is configured to be mounted on a flag pole; the motor mounted on a first surface of a chassis opposite a second surface of the chassis; the second surface facing the sprocket such that the motor and sprocket are axially aligned with respect to one another along a horizontal rotational axis of the motor and sprocket;
- wherein the halyard mechanism includes a sprocket and a halyard, wherein said halyard includes a periodic textured pattern configured to reciprocally pass through the sprocket without slippage, and wherein the control unit is configured to track movement of the flag based on the periodic textured patter of the halyard.

2. The system of claim 1, wherein the instructions are configured to actuate the movement mechanism to move the flag to the predetermined location of the flagpole at a specified time and date.

3. The system of claim 2, wherein the centralized controller is configured to communicate the instructions to subscriber control units, and/or wherein the instructions are configured from a flag honors event including one or more of a reason, extent, and duration of the flag honors event.

4. The system of claim 1, wherein the instructions comprise source- level data gathered from individual state governments.

5. The system of claim 1, wherein the instructions are communicated to the centralized controller based on data from online news sites or broadcast news sources.

6. The system of claim 3, wherein the flag honors event is collected from federal, state, or local government orders.

7. The system of claim 3, wherein the flag honors event is pushed to the centralized controller using one or more of electronic mail, text messaging, and social media posts.

8. The system of claim 3, wherein the centralized controller is connected to a worldwide web for access by one or more subscriber controllers, wherein the system includes a display unit to display details of the flag honors event on subscriber own web sites, mobile applications, or dedicated devices to inform interested parties.

9. The system of claim 1, wherein the power source comprises a battery and a solar array configured to charge the battery.

10. The system of claim 1, wherein the power source comprises continuous power including household current converted to lower voltage before distribution to the flagpole.

11. The system of claim 1, wherein communication to the control unit is provided by any one of local area network, broadband wireless, or Bluetooth.

12. The system of claim 1, including a power management unit configured to selectively distribute power to the power source and to supervise charging of a backup battery.

13. The system of claim 12, wherein a motor driver acting on signals received from the control unit is configured to provide power from the power management unit to actuate a gear motor of the movement mechanism to move the flag up or down the flagpole.

* * * * *